US006985606B1

(12) United States Patent
Wilkinson (10) Patent No.: US 6,985,606 B1
(45) Date of Patent: Jan. 10, 2006

(54) METHOD FOR IDENTIFYING SEDIMENTARY BODIES FROM IMAGES AND ITS APPLICATION TO MINERAL EXPLORATION

(75) Inventor: Murray Justin Wilkinson, Seabrook, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 681 days.

(21) Appl. No.: 10/212,579

(22) Filed: Aug. 1, 2002

Related U.S. Application Data

(60) Provisional application No. 60/362,670, filed on Mar. 8, 2002.

(51) Int. Cl.
G06K 9/00 (2006.01)
(52) U.S. Cl. .................. 382/109; 382/113; 348/85
(58) Field of Classification Search .......... 382/100, 382/109, 113; 348/85; 356/241.1, 237.4, 356/237.5; 73/61.65, 170.32, 784
See application file for complete search history.

(56) References Cited

U.S. PATENT DOCUMENTS 5,038,378 A * 8/1991 Chen ...................... 382/109
5,815,465 A * 9/1998 Turgut ..................... 367/87
5,859,367 A * 1/1999 Holbrook ................ 73/152.05

* cited by examiner

Primary Examiner—Kanjibhai Patel
Assistant Examiner—Abolfazl Tabatabai
(74) Attorney, Agent, or Firm—Theodore U. Ro; Kurt G. Hammerle; James M. Cate (57) ABSTRACT

A method is disclosed for identifying a sediment accumulation from an image of a part of the earth's surface. The method includes identifying a topographic discontinuity from the image. A river which crosses the discontinuity is identified from the image. From the image, paleocourses of the river are identified which diverge from a point where the river crosses the discontinuity. The paleocourses are disposed on a topographically low side of the discontinuity. A smooth surface which emanates from the point is identified. The smooth surface is also disposed on the topographically low side of the point.

23 Claims, 10 Drawing Sheets

METHOD FOR IDENTIFYING SEDIMENTARY BODIES FROM IMAGES AND ITS APPLICATION TO MINERAL EXPLORATION

CROSS-REFERENCE TO RELATED APPLICATIONS

This invention claims priority from U.S. provisional application Ser. No. 60/362,670 filed on Mar. 8, 2002.

STATEMENT REGARDING FEDERALLY SPONSORED RESEARCH OR DEVELOPMENT

This invention was made in the performance of work under a NASA contract and is subject to the provisions of Section 305 of the National Aeronautics and Space Act of 1958, Public Law 85-568 (72 Stat. 435, 42 U.S.C § 2457).

BACKGROUND OF INVENTION

1. Field of the Invention

This invention relates generally to the field of geologic mapping of sedimentary bodies on the earth's surface. More specifically, the invention relates to techniques for identifying sedimentary bodies and patterns using aerial or space-based images.

2. Background Art

Exploration for minerals, including petroleum, includes as one of several initial tasks identifying geographic areas of the earth in which accumulations of geologically prospective materials is likely. Particularly in petroleum exploration, the geologically prospective materials include sediments.

Sediments are produced, among other ways, by the action of wind and water on the surface of the earth. Wind and water tend to erode materials from the elevated features and carry them some distance related to the distance at which the erosive agent (wind or water) moves and on the particle size of the materials actually moved from upland areas. Sediments may then be deposited at other places on the earth's surface by any one of a number of processes. Accumulations of sediment typically take place in localized depressions on the earth's surface known as "basins."

Exploration techniques known in the art include structural mapping of surface exposures ("outcrops") of sediments, mapping features on the earth's surface, reflection seismography of structures disposed under the earth's surface, gravitometry (measurement of local acceleration of earth's gravity) mapping, mapping of the earth's local magnetic field, and magnetotelluric (mapping of local electromagnetic fields generated by electromagnetic radiation from space) mapping, among others. These exploration techniques are intended, among other purposes, to identify, within accumulations of sediment, locations where mineral bearing structures are most likely to be found. Many sediment accumulations commonly occur within basins. After identification of accumulations of sediment, the localized structural and stratigraphic mapping techniques, including, for example, seismic mapping and seismic stratigraphy, can be used to more precisely evaluate the likelihood of the presence of suitable sediment compositions and suitable geologic structures in which minerals may be found.

Exploration techniques known in the art, particularly those used in petroleum exploration, rely to a great extent on identification of areas where rivers deposited sediment in coastal areas, in order to locate substantial sediment accumulations. These deposits in coastal areas may be associated with currently active rivers, for example, sediment deposits in the Gulf of Mexico near the mouth of the Mississippi River, or they may be in geologic areas believed to have been associated with coastal sediment deposition in the past. The exploration techniques known in the art, however, can be time consuming and expensive, and may ultimately fail to identify certain very large sediment accumulations in non-coastal areas because of practical limitations on the scale at which techniques known in the art can be performed. It is therefore desirable to provide exploration techniques which can enable quick evaluation of large areas of the earth's surface, and which may identify previously unknown sediment accumulations.

SUMMARY OF INVENTION

The invention is a method for identifying a sediment accumulation from an image of a part of the earth's surface. The method includes identifying a topographic discontinuity from the image. A river which crosses the discontinuity is identified from the image. From the image, paleocourses of the river are identified which diverge from a point where the river crosses the discontinuity. The paleocourses are disposed on a topographically low side of the discontinuity. A smooth surface which emanates from the point is identified. The smooth surface is also disposed on the topographically low side of the point.

Other aspects and advantages of the invention will be apparent from the following description and the appended claims.

DETAILED DESCRIPTION

Generally speaking, embodiments of a method according to the invention use remotely-sensed images of a portion of the earth's surface as input to a process for identifying particular types of sediment accumulations. "Remotely-sensed images" as used herein may include photographs made from atmospheric traveling aircraft, or spacecraft disposed above the earth's atmosphere. "Photographs" as used herein may include conventional photochemical images, or electronically generated, stored and reproduced images such as those made using a charge coupled device (CCD) camera coupled to suitable signal processing and storage circuitry.

Various embodiments of the invention, as will be further explained, include identification of selected features from the images. Identification of the selected features may include appropriate programming operating on a computer which enables the computer to discriminate portions of the image on the basis of image attributes such as color or brightness. Brightness may correspond to surface reflectivity of various features on the earth's surface. Other programming for a computer to identify selected features may include stereoscopic evaluation of two or more images of substantially the same portion of the earth's surface, where each of the images is made from a different point of origin (relative camera position). One result of stereoscopic evaluation includes generating an elevation map ("contour map") of the imaged portion. As will be further explained, the presence of certain geomorphic or landform features of the area may also be determined from analysis of a contour map. While the following description is intended to instruct how to appropriately program a general purpose computer to perform a method according to the invention, it is within the scope of the invention that the method can be performed by a person visually identifying the same features from images.

Images taken from aircraft or from space provide detailed images of patterns corresponding to significant geomorphic or landform features. It has been discovered that such images may include patterns corresponding to ancient geomorphic or landform features that had not before been discernible. Such patterns include faint patterns corresponding to features such as fluvial fans. Such fluvial fan patterns have been found to correspond with water flow patterns or distributaries, and such fluvial fans, having particular characteristics, may be indicative of deposits of petroleum and other minerals.

One geomorphic feature of particular interest that may be identified using methods according to the invention comprises what is termed large fans. A large fan is a partial cone of sediment usually formed by a single dominant river. The river typically has low declivity. For features having radii of substantial exploratory interest, the river declivity is typically at most about 0.6 degrees. The apex of a large fan is typically located at a mountain front or at a low scarp or similar topographic discontinuity. Large fans had not been previously identified in such numbers, it is believed, because their size is such that they are not readily visible on the ground or from low-altitude photographs, and they may be difficult to identify directly from space-based images.

Interpretation of photographic images made from space, supported by 1:1,000,000 scale contour maps, have so far revealed more than 90 such large fans (such a feature being defined as having a radius greater than about 80 km) indicating that these features are a significant part of the earth's geomorphology. Large fans have been mapped in all continents excluding Antarctica. The largest contiguous group identified at the time of disclosure of this invention is in South America, and the smallest number thus far identified is in North America. In a population of large fans identified thus far with radii greater than 100 km, about 90% of the radii are between about 100 and 300 km. Areas covered by the identified large fans range between about 7,000 and 210,000 $km^2$. Fifty-eight percent lie in foreland and peripheral basins; 36% lie in cratonic settings, with large areas of contiguous large fans in Australia and Africa. The remaining 6% occur in rift basins and interorogenic settings.

It has been determined that by analysis of the distribution of large fans, it is possible to direct the exploration for such features in past landscapes. For example, the early Paleozoic oil and gas reservoirs of North Africa accumulated in settings analogous to the modern cratonic basins of Africa, and the oil and gas reservoirs of the northern half of the Andean foreland basin in South America accumulated in settings analogous to the modern Andean foreland. The study of large fans can also assist in heavy mineral exploration, for example in understanding the dispersal of gold from a primary source.

Large fans provide templates for detailing the architecture of paleo-fluvial reservoir systems deposited during the sediment-filling stage of basin evolution.

Figure 1A:
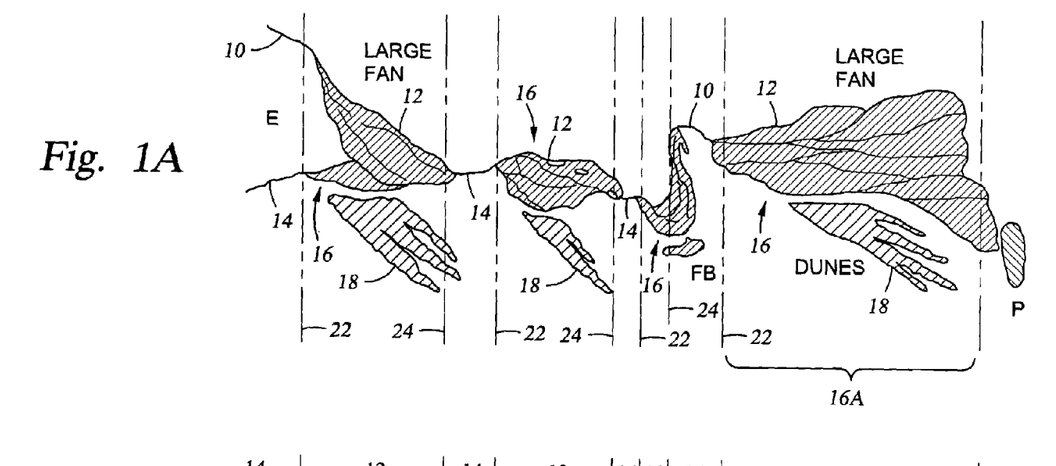
FIGS. 1A and 1B show an example of a sedimentary feature which can be identified using a method according to the invention.
Figure 1B:
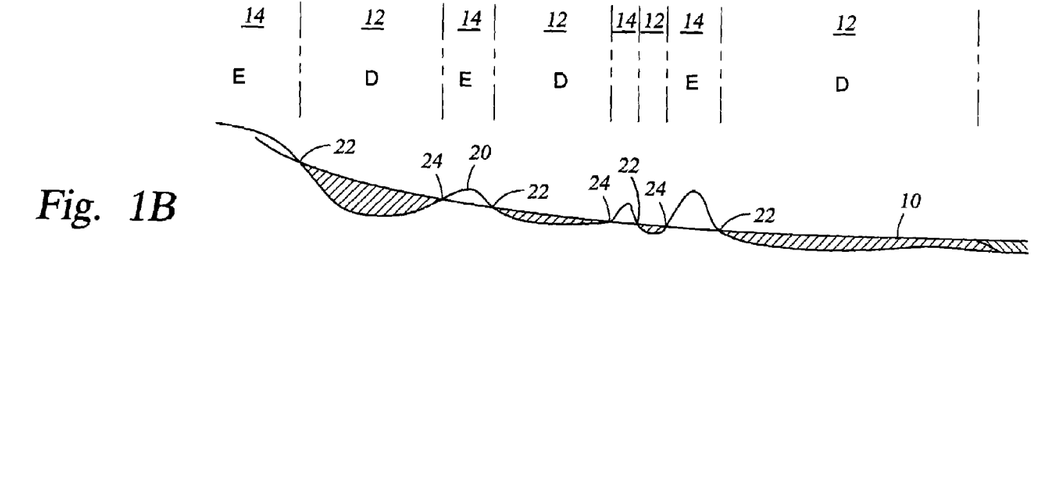

Having described the invention in general terms, more specific examples will now be explained. FIG. 1A shows a plan view of a river 10 flowing across the surface of a "craton." A craton is a tectonically stable part of a continent. Across the surface of the craton are areas which are elevated 14 with respect to an elevation profile of the river 10, and areas which are depressed 12 with respect to the elevation profile of the river 10. The elevated 14 and depressed 12 areas are shown in vertical cross-sectional view in FIG. 1B, upon which view the elevation profile of the river 10 is also displayed. Erosion of materials at the earth's surface tends to occur in the elevated areas 14, while sediment deposition tends to occur in the depressed areas 12.

Referring once again to FIG. 1A, deposition of sediment may take place in fan-like features 16 in the depressed areas 12 least in part due to switching of the river 10 course. In the example of FIG. 1A, sand dunes 18 may also be formed as a result of a prevailing wind (not shown) lifting and moving particles from the fan-like features 16. An upstream end of each depressed area 16 is identifiable by a topographic discontinuity, as shown at 22. A similar discontinuity may be present at a downstream end of each depressed area, as shown at 24. An apex of each fan-like feature 16 occurs where the river 10 crosses one of the upstream topographic discontinuities 22.

Figure 2:
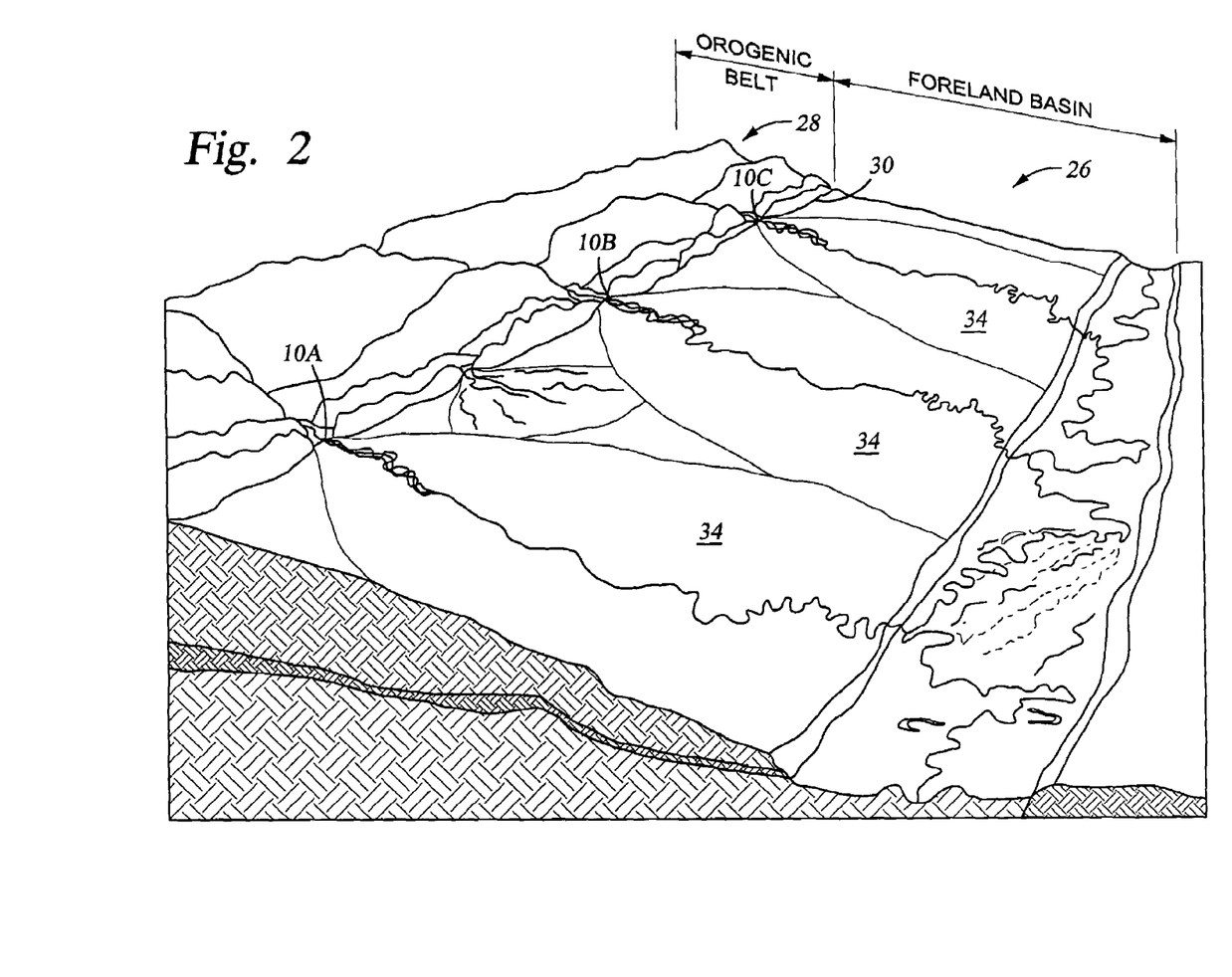
FIG. 2 shows another example of a sedimentary feature which can be identified using a method according to the invention.

Another example of a sedimentary feature which can be identified using a method according to the invention is shown in FIG. 2. The example of FIG. 2 includes deposition of sediment in a "foreland basin." A foreland basin is formed by depression of the earth's crust due to the mass of materials in an orogenic belt 28 (developing mountain range) disposed to one side of the foreland basin 26. Orogenic belts may be formed by collision of tectonic plates on the earth's crust. A well-known example of such an orogenic belt is the Himalayan Mountains. As is known in the art, the relatively large mass of materials in the zone which is formed and uplifted by collision of one of the crustal plates causes rising of one plate and sinking of the other plate. The localized depression results in a foreland basin being formed adjacent to the orogenic belt. As can be observed in FIG. 2, a distinct topographic discontinuity 30 is formed at the boundary between the orogenic belt 28 and the foreland basin 26. Such foreland basins may extend for significant lateral distances, in some cases more than 1,000 km. As can be observed in FIG. 2 with respect to a plurality of rivers 10A, 10B, 10C, the rivers cross the topographic discontinuity 30. At each place where one of the rivers 10A, 10B, 10C crosses the discontinuity 30, the apex of a fan-like feature 34 may exist. The example of FIG. 2 is shown in plan view in FIG. 3.

To distinguish large fans from other geomorphic features, for example, alluvial fans, it is preferred that a distance from the apex to the topographically lowest area of the large fan be at least about 80 km. This distance may be referred to as the radius of the fan. More preferably, the radius is at least about 300 km.

The foregoing examples are not meant to be an exhaustive representation of the geomorphic features associated with large fans. The examples are intended to illustrate two of the important elements of a method according to the invention, namely identifying a topographic discontinuity, and identifying a place at which a river crosses the discontinuity.

Computer programs which enable identification of a river course from images are known in the art. One such program is sold under the trade name ATTRASOFT IMAGEFINDER by Attrasoft, P.O. Box 13051, Savannah, Ga. 31406. Identifying the river is shown in a flow chart in FIG. 7 at 80. Generally speaking, identifying the river from an image may be performed, in addition to the method used in the software just described, by discriminating the image on the basis of features such as color, shading or reflectivity. These are shown, respectively, in FIG. 8 at 80A, 80B and 80C. If any or all of the discriminators have values corresponding to values with values typically noted for a river, the river may thus be identified in an image.

Methods for identifying topographic discontinuities will be further explained as they relate to the invention. Identifying the topographic discontinuity is shown in the flow chart of FIG. 7 at 82.

Figure 3:
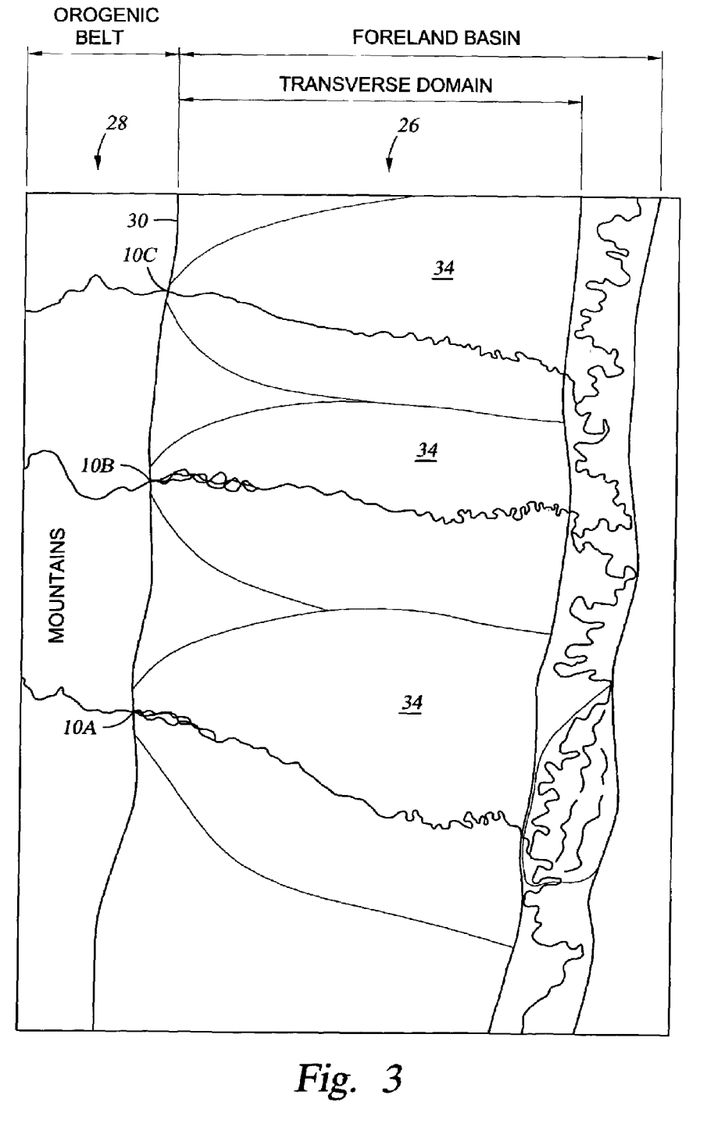
FIG. 3 shows a plan view of the example feature shown in FIG. 2.
Figure 4:
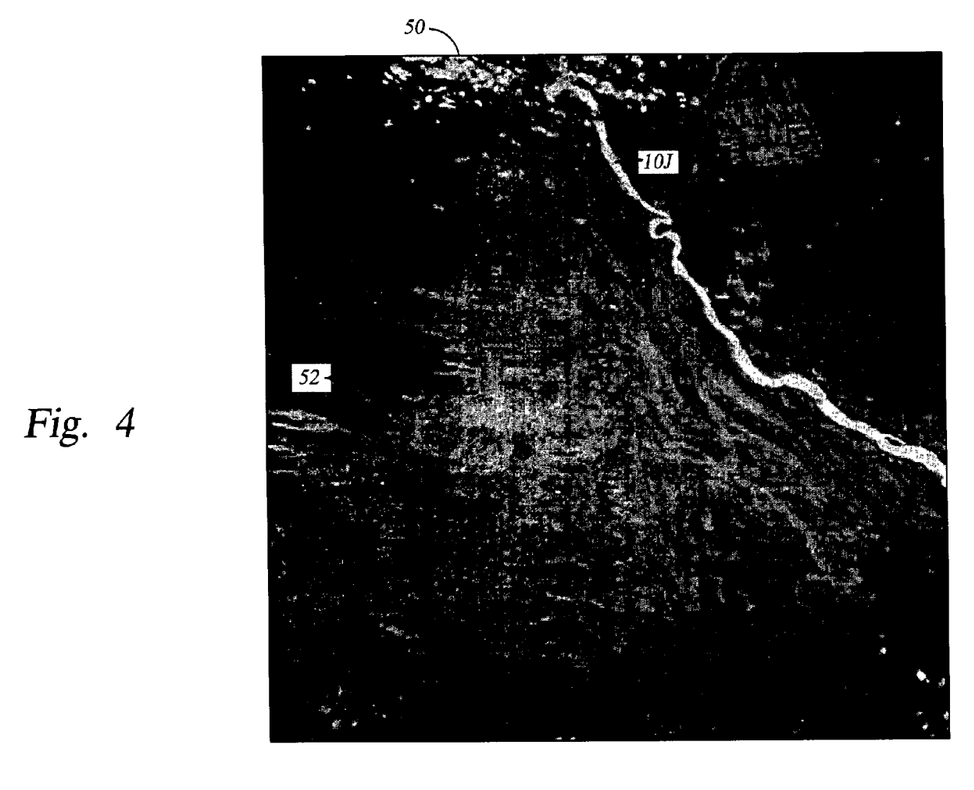
FIG. 4 shows one example of identifying river paleocourses.
Figure 7:
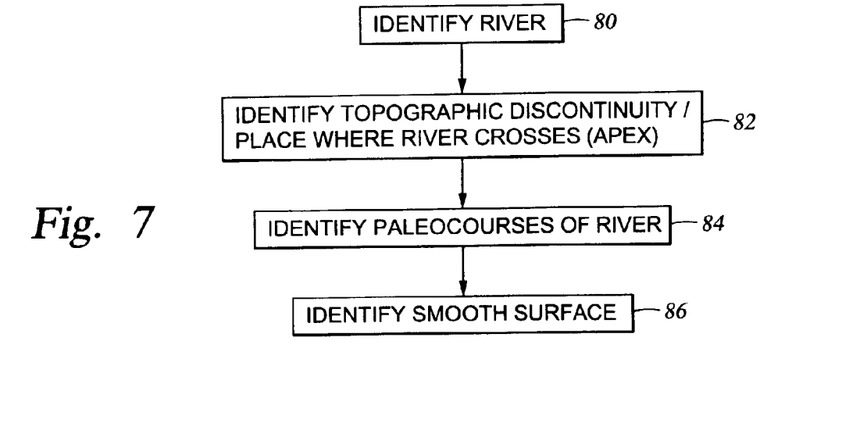
FIG. 7 is a flow chart of one embodiment of a method according to the invention.
Figure 10:
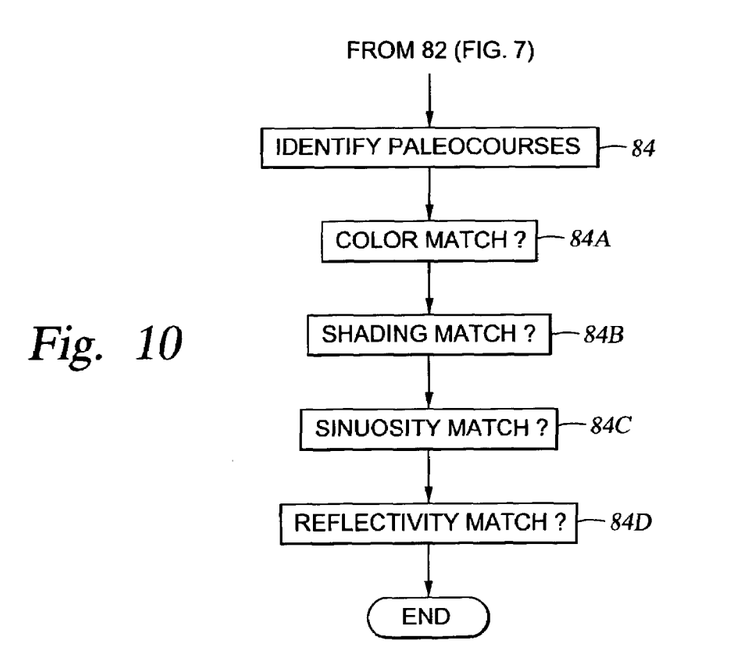
FIG. 10 is a flow chart of an example embodiment of identifying paleocourses.

Referring now to FIG. 4, another element of a method according to the invention will be explained. FIG. 4 is a space photograph which shows a river 10J crossing a topographic discontinuity near the upper border of the frame of the photograph in FIG. 4, as shown at 50. Similar discontinuities are also seen in FIGS. 2 and 3. With continued primary reference to FIG. 4, at 52, a series of distributary features, which in FIG. 4 are river paleocourses, can be identified. Identifying the paleocourse is shown in the flowchart of FIG. 7 at 84. A paleocourse, as previously explained, is a course previously occupied by the river bed. The river (10J in FIG. 4) can be identified from a photograph by selection of corresponding shading, as suggested in FIG. 4, and as shown at 80A, 80B and 80C in FIG. 8. Shading as used herein includes a gray-scale level or density, as suggested by the black and white photograph of FIG. 4. Shading also includes associated color, if color photographs or images are used. Appropriate shading which enables computer identification of a river may be performed, for example, by using an appropriate filter during photograph exposure. Identifying the paleocourses by shading and color matching are shown in FIG. 10 at 84B and 84A, respectively.

Identification of the topographic discontinuity may also be performed by pattern recognition processes by digitizing the images and utilizing pattern recognition computer programs, as known to those in the art. Identification of topographic discontinuity may also be performed by corresponding shading selection, as shown at 82D in FIG. 9. For example, the higher ("uplifted" in the case of a fault discontinuity) side of a topographic discontinuity may show more variation in shading than the downthrown side.

Paleocourses (52 in FIG. 4) may also be identified by shading selection. In addition, river paleocourses typically have similar sinuosity to the river (10J in FIG. 4). Sinuosity can be defined as a ratio of a selected length along the river to the associated valley length. Features which show similar sinuosity and width to the river (10J in FIG. 4) are likely to be paleocourses of the river. Identifying the paleocourses by matching sinuosity is shown in FIG. 10 at 84C.

If color photographs and images are used, identification of the river (see 80A in FIG. 8), the paleocourses (see 84A in FIG. 10) and the topographic discontinuity (see 82D in FIG. 9) may be made on the basis of color. River water of an active river is relatively easily identifiable on the basis of color. Paleocourses may show color which is similar to that of the current river bed when water is not flowing in the river bed. In some areas, the river bed may become exposed during dry periods. The topographic discontinuity will typically have an identifiable change in color on either side. This may be related to a difference in drainage density, surface vegetation or in the composition of surface exposed rock. Computer programs which enable identification of such features from color photographs are known in the art. One type of such program is sold under the trade name GAIA by Avian Systems, Inc. Tenafly, N.J. 07670.

Still another method for identifying the river (see 80C in FIG. 8), the topographic discontinuity (see 82A in FIG. 9) and paleocourses (see 84D in FIG. 10) is to make the aerial image by mapping light reflectivity of the earth's surface. An image made by mapping reflectivity will in many cases show similar features to a photograph, particularly if the photograph is used to identify features on the basis of shading.

Figure 5:
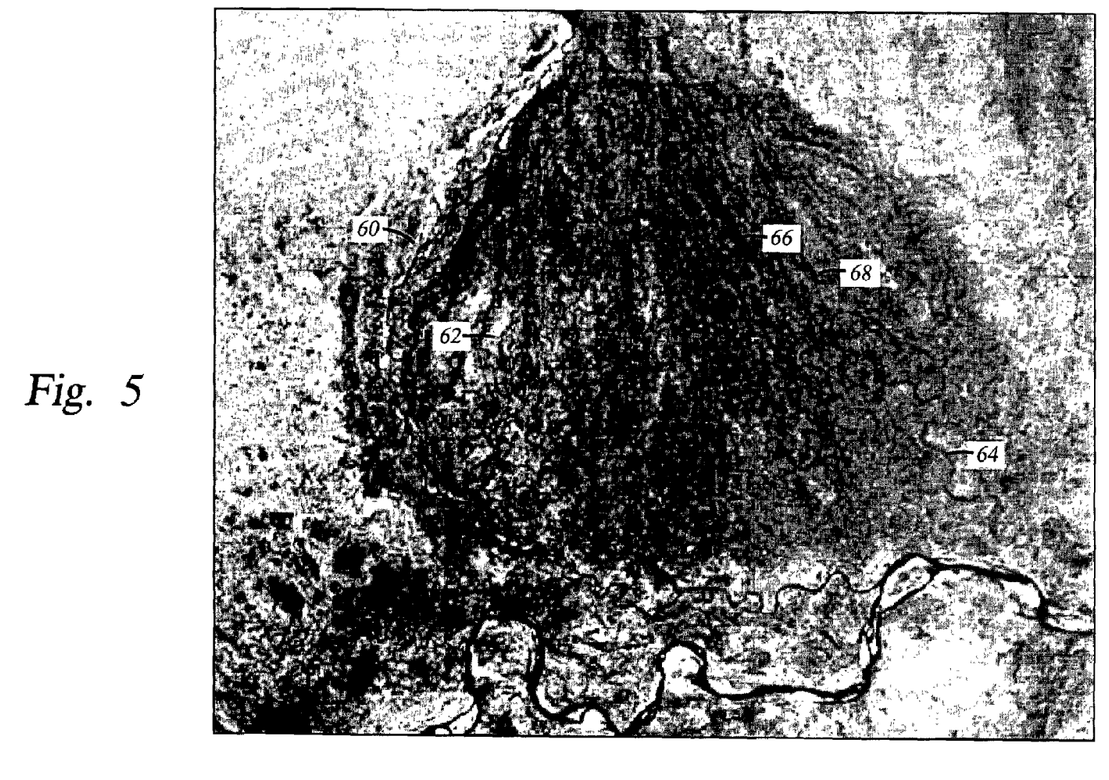
FIG. 5 shows another example of identifying river paleocourses.

Another example of paleocourse identification is shown in FIG. 5. A modern river course or bed is shown at 60. Paleocourses which may be identified by shading and sinuosity can be observed at 62, 64, 66 and 68 in FIG. 5.

Another type of distributary feature which may be identified, for example, by surface reflectivity is a valley produced by the river flowing along the paleocourse.

Figure 11:
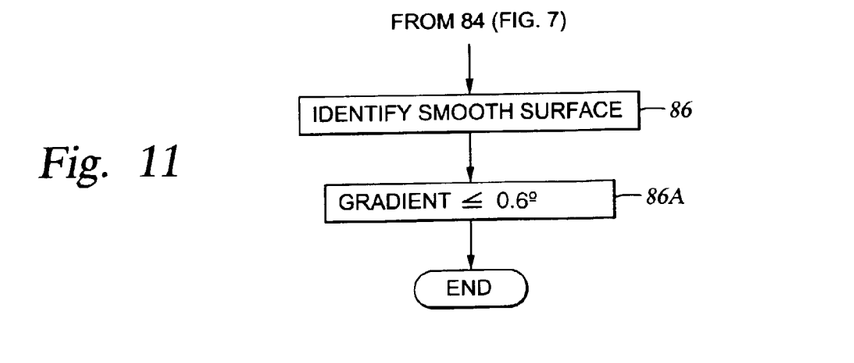
FIG. 11 is a flow chart of an example embodiment of identifying a smooth surface.

Finally, in a method according to the invention, a smooth surface should be identified after the paleocourses are identified. This is shown in the flowchart of FIG. 7 at 86). A smooth surface as used herein means a geographic area having at most about 10 meters vertical difference per 2000 meters horizontal difference. See 86A in the flow chart of FIG. 11. It should be noted here that the modern course of the river, as well as the paleocourses, may have caused erosion on the surface which causes the surface to exceed the previously stated roughness value. When identifying the smooth surface, areas which have been eroded may be excluded from the identification. Identification of the smooth surface is preferably made from a contour map or similar elevation discriminator. Typically, a sedimentary body of exploratory interest is coextensive with such a smooth surface having a radius of at least about 80 kilometers, and with respect to large deposits, preferably at least about 300 kilometers.

Figure 6:
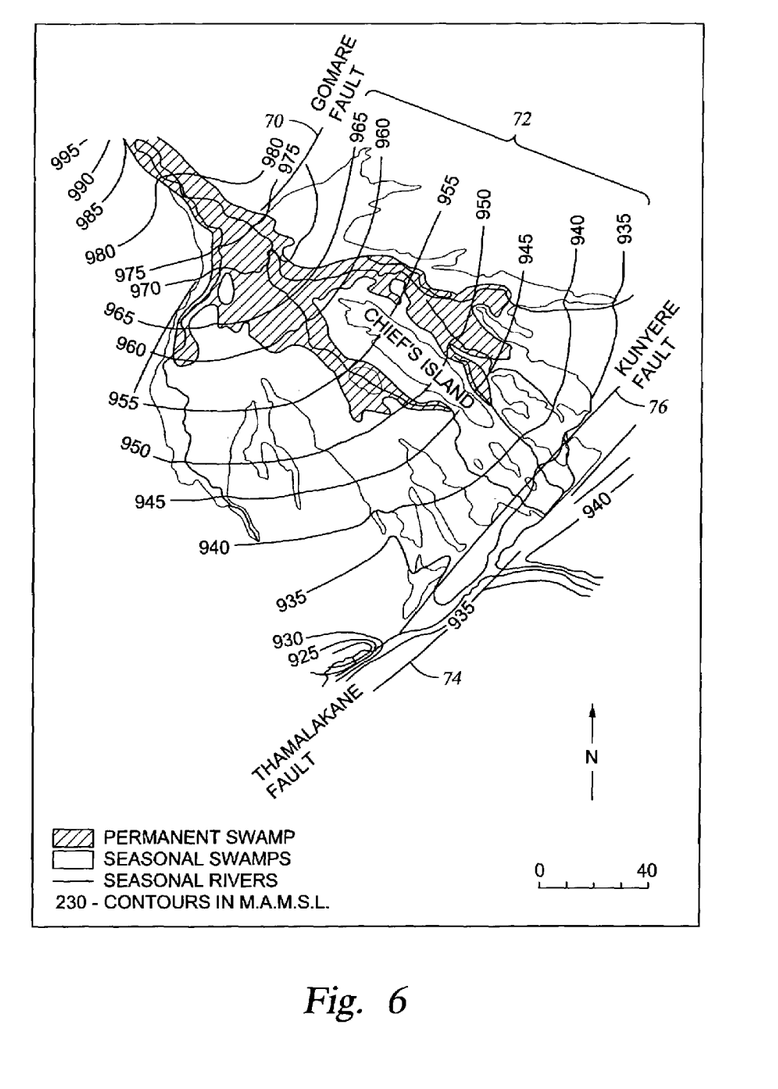
FIG. 6 shows an example of a contour map.

An example of a contour map is shown in FIG. 6. Contour lines 72 represent points of substantially equal elevation. Identification of topographic discontinuities, such as faults, typically can be observed as a "break" or sharp angle in the contour lines 72. Examples of faults in FIG. 6 are shown at 70, 74 and 76. The contour lines 72 are interrupted at the faults 70, 74, 76. Not shown in FIG. 6, but equally applicable to various embodiments of the invention is identification of the topographic discontinuity (for example, as discussed above with reference to 50, FIG. 4). Typically, an elevation gradient, or declivity, will undergo a substantial change in magnitude, and frequently in direction, at the location of the topographic discontinuity. See 82B and 82C in FIG. 9. An example of a smooth surface can also be observed in FIG. 6, generally between fault 70 and fault 76, as evidenced by the shape of the contour lines 72, and the distance between contour lines 72.

Referring once again to FIG. 7, embodiments of a method according to the invention include identifying the river 80, identifying a topographic discontinuity and the place where the river crosses the discontinuity 82, identifying river paleocourses 84 and identifying a smoother surface 86.

Figure 8:
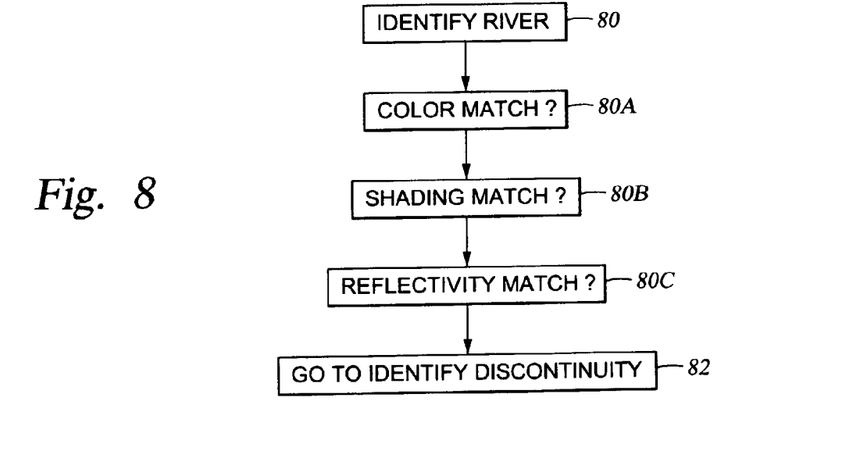
FIG. 8 is a flow chart of an example embodiment of river identification from an image.

Examples of how to identify the river 80 are shown in FIG. 8 and include determining whether image patterns, including contour patterns and/or patterns of color 80A, shading 80B, and/or reflectivity 80C match values associated with rivers in similar images. As previously explained, methods are known in the art for programming a computer to perform river identification. An example of a machine-implementable process for river identification is shown in the flow chart of FIG. 12. If ordinary photochemical images are used, it is first necessary, in this embodiment, to digitize the image, as shown at 90. Digitization of a 2-dimensional image (or an image originally generated and stored in digital form) will produce a set of numbers which correspond to a coordinate location (x, y) of each component ("pixel") of the image, and a number (p) corresponding to an attribute of the image at that pixel location. A distance between the coordinate location of each pixel will depend on the scale of the image and the spatial resolution (number of pixels in the image frame) of the image. The attribute may be, for example, gray scale brightness/density, color or surface reflectivity. For stereoscopically analyzed images used to generate a contour map (or a contour map made by any other method) the attribute value p is the elevation of the earth's surface at the corresponding pixel location.

Figure 12:
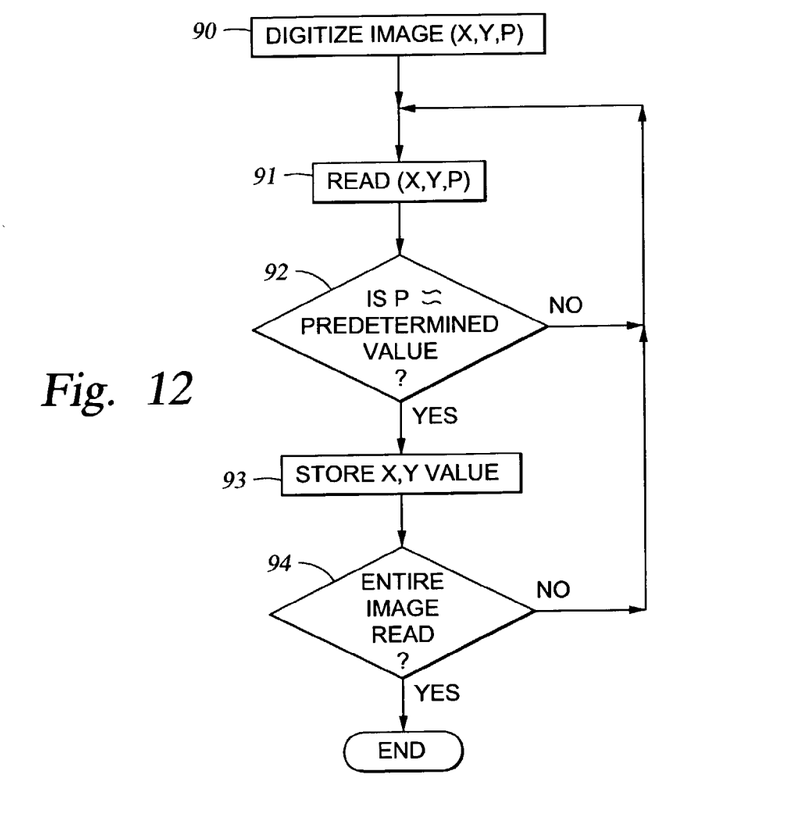
FIG. 12 is a flow chart showing one embodiment of a machine implementable process for feature identification from an image.

In identifying the river, the image data are read, at 91. The value of p in each image pixel (x, y) is compared, at 92 in FIG. 12, to a value of the attribute which is known to correspond to a river. The known value of the attribute may be determined, for example, by analysis of other images such as by visual inspection of the other image for areas known to correspond to a river. For each pixel in which the value of p is approximately equal to the predetermined value, the coordinate position (x, y) of each such pixel can be stored for later analysis. This is shown at 93 in FIG. 12. If the entire image has not been read, at 94 in FIG. 12, then image reading continues with a subsequent pixel. This part of the process stops when all the pixel values have been read. A result of the process shown in FIG. 12 is a set of image coordinates which correspond to the position of the river in the image.

Figure 9:
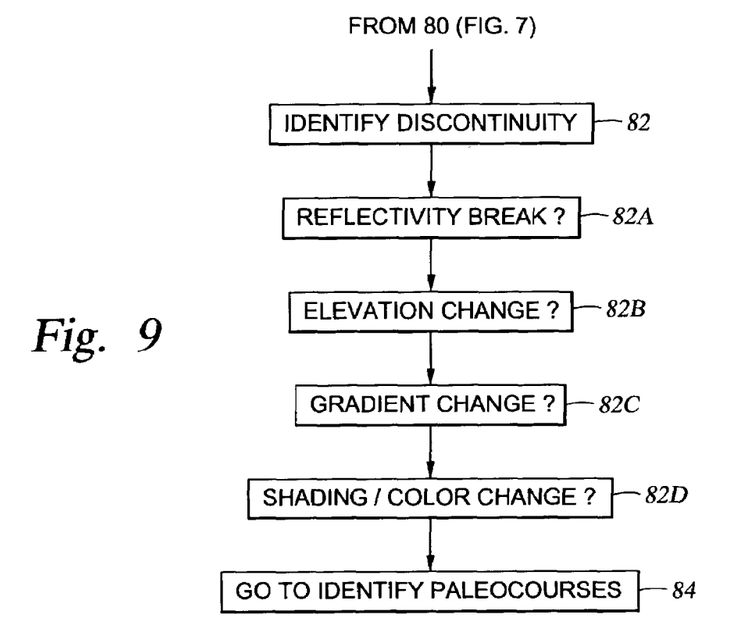
FIG. 9 is a flow chart of an example embodiment of identifying a topographic discontinuity.
Figure 13:
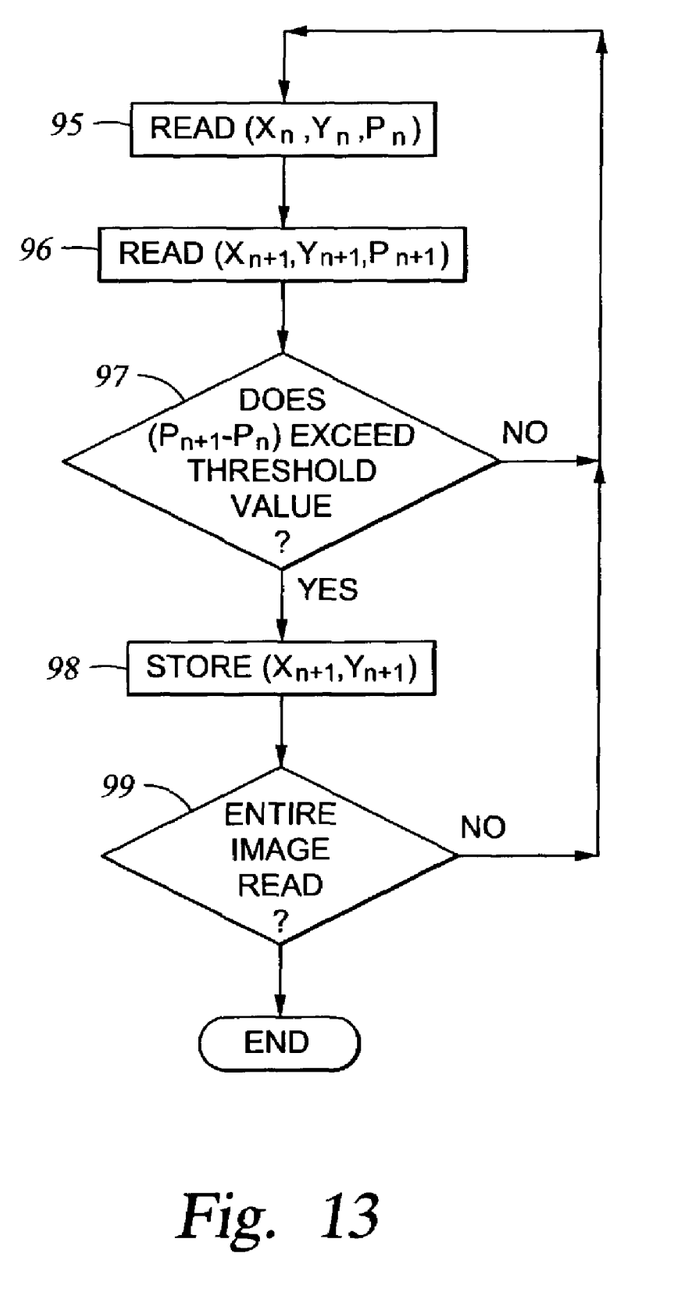
FIG. 13 is a flow chart of one embodiment of a machine implementable process for identifying a topographic discontinuity from an image.

Examples of how to identify the topographic discontinuity (82 in FIG. 7) from an image are shown in the flow chart of FIG. 9 and include determining abrupt changes in image features such as reflectivity 82A, elevation 82B, elevation gradient 82C or shading and/or color 82D. Referring to FIG. 13, an example of a machine-implementable process for identifying the topographic discontinuity includes, at 95, reading the pixel value $p_n$ at each position or pixel location $(x_n, y_n)$ and reading, at 96 in FIG. 13, the pixel value $p_{n+1}$ at the pixel adjacent thereto $(x_{n+1}, y_{n+1})$ in any direction. If a difference between the first-read pixel value and the adjacent pixel value, at 97 in FIG. 13, exceeds a preselected threshold, then the coordinate location $(x_{n+1}, y_{n+1})$ of the position at which the difference exceeds the threshold is stored, at 98 in FIG. 13. This process continues, at 99 in FIG. 13, until the entire image is read and compared. The stored pixel positions where the difference exceeds the threshold correspond to the positions of the topographic discontinuity. Differences in image pixel values may be selected, as previously explained, to correspond to a predetermined change in color, reflectivity or brightness. In other embodiments, an elevation profile (contour map) of the image may be made from a stereoscopic analysis. In such embodiments, the values $p_n$ and $p_{n+1}$ may correspond to elevation or elevation gradient at each pixel location $(x_n, y_n)$ in the image. Determining the difference threshold may be performed by analysis of other images having known types of topographic discontinuities.

Figure 14:
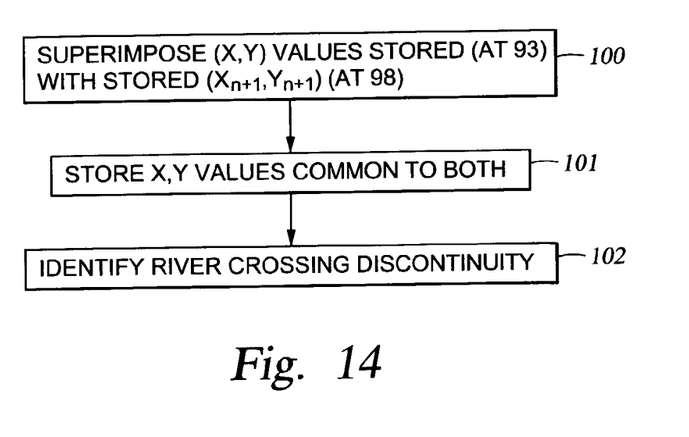
FIG. 14 is an example of a machine implementable process for identifying a point at which a river crosses a topographic discontinuity.

FIG. 14 shows an example of a machine-implementable process for determining the point at which the river crosses the topographic discontinuity, at 100. The positions of the river, as previously determined, are superimposed with the positions of the topographic discontinuity. Values common to both the river and the discontinuity are stored, at 101, and used to identify the crossing point, at 102. Although such machine-implementable processes are preferred, it will be understood that procedures such as scaling, identification of discontinuities, and measurement of fan radii may in some applications be performed visually.

Examples of how to identify paleocourses (84 in FIG. 7) are shown in the flow chart of FIG. 10 and include determining whether color 84A, shading 84B, sinuosity 84C and/or reflectivity 84D match values known for the river and/or river bed. The paleocourses may be identified using a machine implemented process such as shown in FIG. 12 and as previously explained with respect to identifying the river. In a machine implemented process for determining the position of the paleocourses, the pixel value p for the paleocourses can be determined, for example, by analysis of other images.

Finally, a machine-implementable process for determining the smooth surface (86 in FIG. 7) may be similar to the process explained with reference to FIG. 13. In identifying the smooth surface, the difference threshold may be set so that the locations of pixels are stored which have difference values below the threshold with respect to adjacent pixels. As explained previously with reference to FIG. 7, in some embodiments, a difference in elevation of less than about 10 meters in a horizontal distance of about 2,000 meters can be a threshold for the smooth surface. Elevation, as previously explained, may be determined from stereoscopic analysis of the imaged area. In the preferred embodiment, the radius of the surface is determined. In accordance with processing techniques known in the art, the scale of the image or mapped area is determined, and the radius of the smooth-surfaced fan, as measured from its intersection with the discontinuity to the distal portion of the fan, is derived. The radius is evaluated with respect to whether or not the surface comprises a large fan, i.e., one having a radius greater than about 80 kilometers, and preferably greater than about 300 kilometers. Additionally, the slope of the smooth surface is determined, suitably by subtracting the elevation of a distal portion of the fan from that at the apex or peak, and comparing the drop or delta elevation with the radius of the fan. Fans having a slope of less than about 0.6 degrees, and preferably less than about 0.5 degrees, are preferred. In accordance with the invention, fans characterized as having large, smooth surfaced, gradually sloping surfaces in accordance with the above characteristics are selected as candidates for geophysical or seismic exploration for mineral or water deposits. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A machine implemented method for identifying a sediment accumulation from an image of a part of the earth's surface, comprising:
   identifying a topographic discontinuity from the image;
   identifying a river which crosses the discontinuity from the image;
   identifying, from the image, distributary features of the river which diverge from a point where the river crosses the discontinuity, the distributary features disposed on a topographically low side of the discontinuity; and
   identifying a smooth surface which emanates from the point, the smooth surface disposed on the topographically low side.

2. The method as defined in claim 1 wherein a roughness of the smooth surface is at most about 10 meters vertical difference per 2000 meters horizontal difference.

3. The method as defined in claim 1 wherein a radius of the smooth surface is at least about 80 kilometers.

4. The method as defined in claim 1 wherein a radius of the smooth surface is at least about 300 kilometers.

5. The method as defined in claim 1 wherein a declivity of the river is at most about 0.6 degrees.

6. The method as defined in claim 1 wherein the image comprises an aerial photograph.

7. The method as defined in claim 1 wherein the image comprises a space photograph.

8. The method as defined in claim 1 wherein the image comprises a contour map.

9. The method as defined in claim 8 wherein the contour map is generated from stereoscopic analysis of aerial photographs of the part of the earth's surface.

10. The method as defined in claim 1 wherein the identifying the discontinuity comprises determining a difference in color.

11. The method as defined in claim 1 wherein the identifying the discontinuity comprises determining a difference in apparent reflectivity.

12. The method as defined in claim 1 wherein the identifying the discontinuity comprises determining a difference in elevation.

13. The method as defined in claim 1 wherein the identifying the discontinuity comprises determining a difference in elevation gradient.

14. The method as defined in claim 1 wherein the identifying the river comprises identifying a color associated with river water.

15. The method as defined in claim 1 wherein the identifying the river comprises identifying a surface reflectivity associated with river water.

16. The method as defined in claim 1 wherein the distributary features comprise paleocourses, the identifying the paleocourses comprises identifying a color similar to a color of a bed of the river.

17. The method as defined in claim 1 wherein the distributary features comprise paleocourses, the identifying the paleocourses comprises identifying a surface reflectivity similar to a surface reflectivity of a bed of the river.

18. The method as defined in claim 1 wherein the distributary features comprise paleocourses, the identifying the paleocourses comprises identifying a color similar to a color of a bed of the river, the similar color also determined to be different than a color of an area surrounding the identified similar color.

19. The method as defined in claim 1 wherein the distributary features comprise paleocourses, the identifying the paleocourses comprises identifying features having a sinuosity substantially the same as a sinuosity of the river.

20. The method as defined in claim 1 wherein the distributary features comprise paleocourses, the identifying the paleocourses comprises identifying features having a width substantially the same as a width of the river.

21. The method as defined in claim 1 wherein the topographic discontinuity comprises a fault.

22. The method as defined in claim 1 wherein the topographic discontinuity comprises a boundary between an orogenic belt and a foreland basin.

23. The method as defined in claim 1 wherein the topographic discontinuity comprises a boundary between an area which is elevated with respect to an elevation profile of a river and an area which is depressed with respect to the elevation profile of the river.

* * * * *